United States Patent
Chiang et al.

(10) Patent No.: US 7,009,917 B2
(45) Date of Patent: Mar. 7, 2006

(54) LAYER JUMP CONTROL FOR AN OPTICAL DRIVE

(75) Inventors: Shih-Chun Chiang, Taipei (TW); Chen-Hsing Lo, Taipei (TW)

(73) Assignee: Mediatek Incorporation, Hsinchu (TW)

( * ) Notice: Subject to any disclaimer, the term of this patent is extended or adjusted under 35 U.S.C. 154(b) by 458 days.

(21) Appl. No.: 09/997,136

(22) Filed: Nov. 28, 2001

(65) Prior Publication Data

US 2003/0076755 A1    Apr. 24, 2003

(30) Foreign Application Priority Data

Oct. 19, 2001    (TW) ................ 90125930 A

(51) Int. Cl.
*G11B 7/00* (2006.01)
(52) U.S. Cl. ............... 369/44.27; 369/44.25; 369/44.29; 369/94
(58) Field of Classification Search ............ 369/94, 369/44.25, 44.26, 44.27; 361/53.19
See application file for complete search history.

(56) References Cited

U.S. PATENT DOCUMENTS

| | | | | |
|---|---|---|---|---|
| 5,740,136 A | * | 4/1998 | Tsutsui et al. ........... | 369/44.27 |
| 5,748,597 A | * | 5/1998 | Kim .......................... | 369/94 |
| 5,999,503 A | * | 12/1999 | Tateishi et al. ........... | 369/94 |
| 6,091,680 A | * | 7/2000 | Matsuda et al. ......... | 369/44.27 |
| 6,246,646 B1 | * | 6/2001 | Abe et al. ................. | 369/44.27 |
| 6,552,971 B1 | * | 4/2003 | Iida .......................... | 369/53.28 |

FOREIGN PATENT DOCUMENTS

| | | | | |
|---|---|---|---|---|
| JP | 10124883 A | * | 5/1998 | |
| JP | 10222868 A | * | 8/1998 | |

* cited by examiner

Primary Examiner—W. R. Young
Assistant Examiner—Jorge L. Ortiz-Criado
(74) Attorney, Agent, or Firm—Ladas & Parry LLP

(57) ABSTRACT

A layer jump control apparatus of an optical drive. The layer jump control apparatus has a pick up head, a preamplifier, a controller producing a focusing control signal FC, a low pass filter for receiving FC and producing a layer distance balancing signal LC, and a driving device to send a driving force to the pick up head. When the optical drive does not perform the layer jump process, the driving device receives FC. When the optical drive performs the layer jump process, the driving device receives a kicking signal and LB to determine the driving force in the kicking process; the driving device receives a braking signal and LB to determine the driving force in when the optical drive performs the braking process; and the driving device receives LB to determine the driving force in the holding process and the waiting process.

13 Claims, 4 Drawing Sheets

LAYER JUMP CONTROL FOR AN OPTICAL DRIVE

BACKGROUND OF THE INVENTION

1. Field of the Invention

The present invention relates to an apparatus for controlling a layer jump process of an optical drive, and particularly to an apparatus for controlling the layer jump process of a DVD drive.

2. Description of the Related Art

Generally, an optical disk can be classified into two categories according to the number of layers. That is, an optical disk can be a single layer disk such as a CD disk, a VCD disk or a DVD-5 disk, DVD-10 disk, or a dual layer disk such as a DVD-9 disk or a DVD-18 disk. When an optical drive reads the dual layer DVD disk, the pick up head of the optical drive moves its laser spot between the two layers. As a result, it is necessary to involve a layer jump process of the optical drive in order to move the laser spot from the initial layer to the target layer.

FIG. 1a to FIG. 1c are schematic diagrams of the pick up head in a conventional optical drive. The pick up head is composed of a lens 210 and a voice coil motor 220. The voice coil motor 220 is driven to move the lens 210 in the vertical direction. In FIG. 1a, the lens 210 is located in a natural equilibrium position B, as shown by the solid line. The lens 210 can be moved to the position L0 as shown by the dotted line in FIG. 1b, so that the laser spot is focused on layer 0 of the disk; otherwise, the position L1 as shown by line L1 in FIG. 1c, so that the laser spot is focused on layer 1 of the disk. As shown in FIG. 1b and FIG. 1c, a distance Do exists between the position L0 and the natural equilibrium position B, and a distance D1 exists between the position L1 and the natural equilibrium position B. The sum D=(Do+D1) is the layer distance of the disk.

The purpose of performing the layer jump process is to move the laser spot from the initial layer to the target layer. For example, the lens may move from the position L0 as shown in FIG. 1b to the position L1 as shown in FIG. 1c. Generally, the driving force involved in the layer jump process includes a control force to drive the voice coil motor to move the lens from the natural equilibrium position to the initial layer, a kick force to move the pick up head away from the initial layer, and a brake force to keep the pick up head in the target layer. The control force is always necessary when the lens is placed in the position L0 in order to keep the lens from moving back to the natural equilibrium position B. When the optical drive performs the layer jump process, the lens 210 moves out from the position L0 toward a linear controlled area of the position L1 by the kick force; then, the brake force is applied to slow down the lens 210, so that the lens 210 will stop in the linear controlled area when it reaches the position L1. Thus, the layer jump process is completed.

However, the aforementioned conventional method to control the layer jump process has its drawbacks as described below.

The dual layer disk, such as a DVD-9 disk or a DVD-18 disk, generally has a layer distance of 55±15 μm between its two layers, in which each layer has a linear controlled area of ±1 mm. It is obvious that the linear controlled area is relatively smaller, and the layer distance even has a larger variation. Therefore, if the optical drive estimates the position of the layer jump process from the natural equilibrium position B in each dual layer disk and applies the control force, the kick force and the brake force with the same intensity, it is possible that layer jump failure might occur in dual layer disks.

In addition, a dual layer disk may be irregularly manufactured or printed in the disk printing process, or be placed in an inaccurate position in the optical drive, so that the disk wobbles in rotating for the pick up head to read. If the disk wobbles, the disk layers sway up-and-down vertically in relation to the natural equilibrium position B of the lens. Therefore, the driving force irregularly increases or decreases in the layer jump process, which reduces the stability of the layer jump process and may cause failure.

SUMMARY OF THE INVENTION

In view of the above-mentioned drawbacks, the object of the present invention is to disclose a layer jump control apparatus and a method of controlling the layer jump process, which reduces the possibility of failure occurred due to the layer distance variation or the disk wobbling, so that the layer jump process can be performed smoothly.

The present invention discloses an apparatus for controlling layer jump in an optical drive, wherein the layer jump process comprises a kicking process, a holding process, a braking process and a waiting process. The layer jump control apparatus comprises: a pick up head having a lens and a voice coil motor, wherein the pick up head drives the voice coil motor in accordance with a driving force to vertically move the lens; a preamplifier for producing a focusing error signal; a controller for receiving the focusing error signal and producing a focusing control signal; a low pass filter for receiving the focusing control signal and producing a layer distance balancing signal; and a driving device for outputting the driving force.

In the above-mentioned layer jump control apparatus, the driving device receives the focusing control signal to determine the driving force when the optical drive does not perform the layer jump process; the driving device receives a kicking signal and the layer distance balancing signal to determine the driving force when the optical drive performs the kicking process; the driving device receives a braking signal and the layer distance balancing signal to determine the driving force when the optical drive performs the braking process; and the driving device receives the layer distance balancing signal to determine the driving force when the optical drive performs the holding process and the waiting process.

In the above-mentioned layer jump control apparatus, the optical drive can be a DVD drive; the controller can be an equalizer; and the layer distance balancing signal can be a direct current voltage level of the focusing control signal.

The present invention also discloses an optical drive for performing a layer jump process, wherein the layer jump process comprises a kicking process, a holding process, a braking process and a waiting process. The optical drive comprises: a pick up head having a lens and a voice coil motor, wherein the pick up head drives the voice coil motor in accordance with a driving force to vertically move the lens; a preamplifier for producing a focusing error signal; a controller for receiving the focusing error signal and producing a focusing control signal; a low pass filter for receiving the focusing control signal and producing a layer distance balancing signal; and a driving device for outputting the driving force.

In the above-mentioned optical drive, the driving device receives the focusing control signal to determine the driving force when the optical drive does not perform the layer jump process; the driving device receives a kicking signal and the layer distance balancing signal to determine the driving force when the optical drive performs the kicking process; the driving device receives a braking signal and the layer distance balancing signal to determine the driving force when the optical drive performs the braking process; and the driving device receives the layer distance balancing signal to determine the driving force when the optical drive performs the holding process and the waiting process.

The above-mentioned optical drive can be a DVD drive. Further, in the above-mentioned optical drive, the controller can be an equalizer, and the layer distance balancing signal can be a direct current voltage level of the focusing control signal.

The present invention also discloses a method of controlling an optical drive to perform a layer jump process, wherein the optical drive comprises a vertically movable pick up head, a preamplifier, a controller, and a low pass filter. The method comprises the steps of: receiving a focusing error signal produced by the preamplifier in the controller to produce a focusing control signal; sending the focusing control signal to the low pass filter to produce a layer distance balancing signal; performing a kicking process in accordance with a kicking signal and the layer distance balancing signal; performing a holding process in accordance with the layer distance balancing signal; performing a braking process in accordance with a braking signal and the layer distance balancing signal; and performing a waiting process in accordance with the layer distance balancing signal.

In the method of the present invention, the optical drive can be a DVD drive; the controller can be an equalizer; and the layer distance balancing signal can be a direct current voltage level of the focusing control signal.

The present invention is characterized that the low pass filter produces the layer distance balancing signal for indication of the natural equilibrium position at the beginning of the layer jump process. The layer distance balancing signal is employed along with the kicking signal in the kicking process or the braking signal in the braking process, so that the layer jump process is not affected by the layer distance variation or the disk wobbling that may lead to failure. Thus, it is easier to control the layer jump process, and the possibility of failure in the layer jump process is reduced.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE PREFERRED EMBODIMENT

The layer jump control apparatus of the present invention is hereinafter described in detail with a preferred embodiment referring to FIG. 2.

Figure 1:
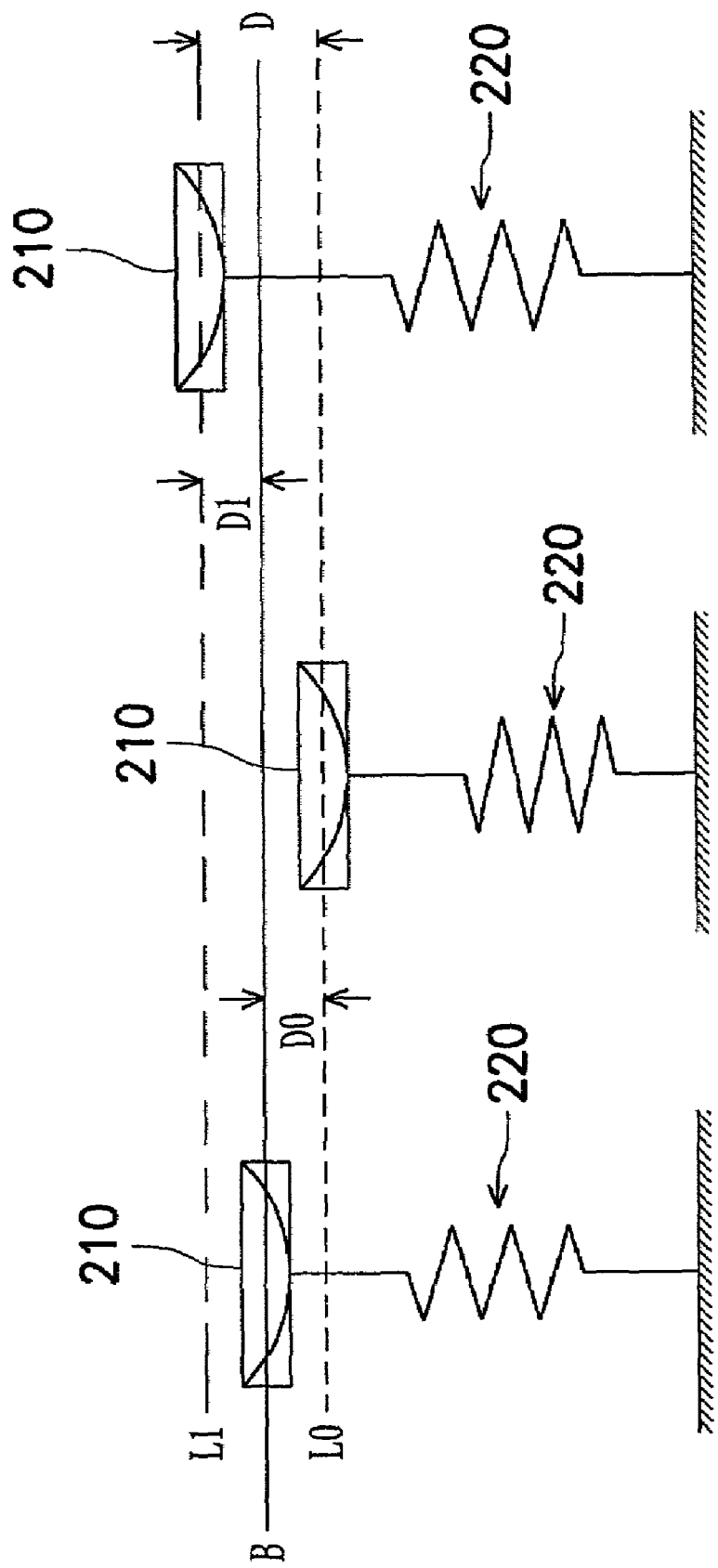
FIG. 1a to FIG. 1c are schematic diagrams showing a conventional pick up head.
Figure 2:
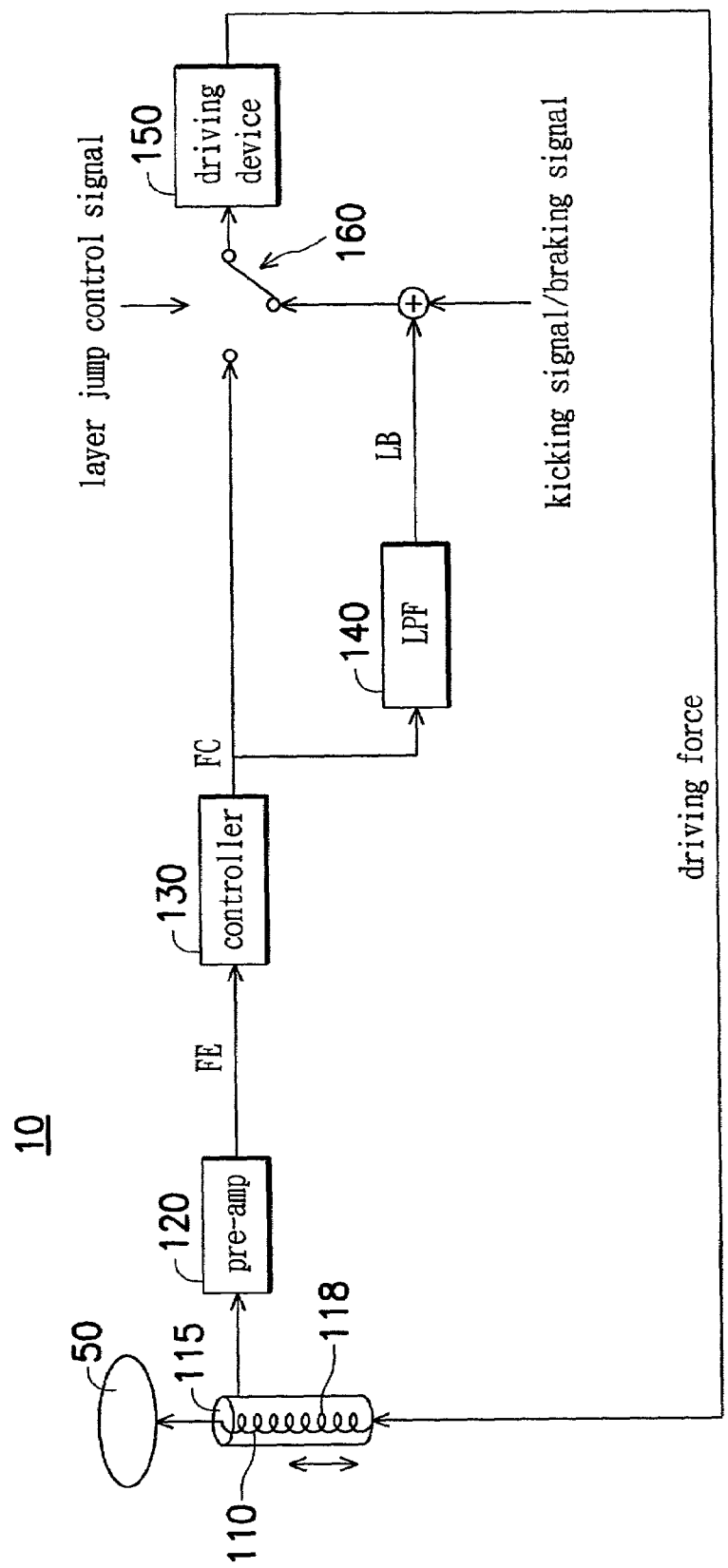
FIG. 2 is a block diagram showing the layer jump control apparatus of the present invention.

The layer jump control apparatus 10 in FIG. 2 is utilized to control the layer jump process of an optical drive, such as a DVD drive, in which the layer jump process is described later. The layer jump control apparatus 10 has a pick up head 110, a preamplifier (or a pre-amp for short) 120, a controller 130, a low pass filter (LPF) 140, and a driving device 150. The structure of the pick up head 110 is similar to the conventional pick up head as shown in FIG. 1a to FIG. 1c, which has a lens 115 and a voice coil motor 118. The voice coil motor 118 is driven by a driving force to move the lens 115 in the vertical direction. The pre-amp 120 produces a focusing error signal FE according to the movement of the pick up head 110. The controller 130 can be an equalizer for receiving the focusing error signal FE and producing a focusing control signal FC with proper transition. The low pass filter 140 receives the focusing control signal FC, and produces a layer distance balancing signal LB, such as a direct current voltage level of the focusing control signal. The driving device 150 is utilized to output the driving force to the pick up head 110.

Further, there is a switch 160 in FIG. 2 for controlling activation of the layer jump process. When the layer jump process is not activated, the switch 160 enables the focusing control signal FC to be sent to the driving device 150 to determine the driving force; when the layer jump process performs, the switch 160 enables the low pass filter 140 to send the layer distance balancing signal LB to the driving device 150 in coordination with the kicking signal or the braking signal. The switch 160 in FIG. 2 is in the state that enables performing the layer jump process.

It should be noted that the aforementioned layer jump control apparatus 10 of this embodiment of the present invention can be utilized in any optical drive for dual layer optical disk. For example, the layer jump control apparatus 10 can be used in a DVD drive that reads a DVD disk 50, such as a single-sided dual layer DVD-9 disk or a double-sided dual layer DVD-18 disk. Further, it is also applicable to use the layer jump control apparatus 10 in any other form of dual layer reading device that requires a layer jump process.

In this embodiment, the layer jump process performed in the aforementioned layer jump control apparatus 10 sequentially includes a kicking process, a holding process, a braking process, and a waiting process. Control of these processes is further described in reference to FIG. 3 and FIG. 4.

Figure 3:
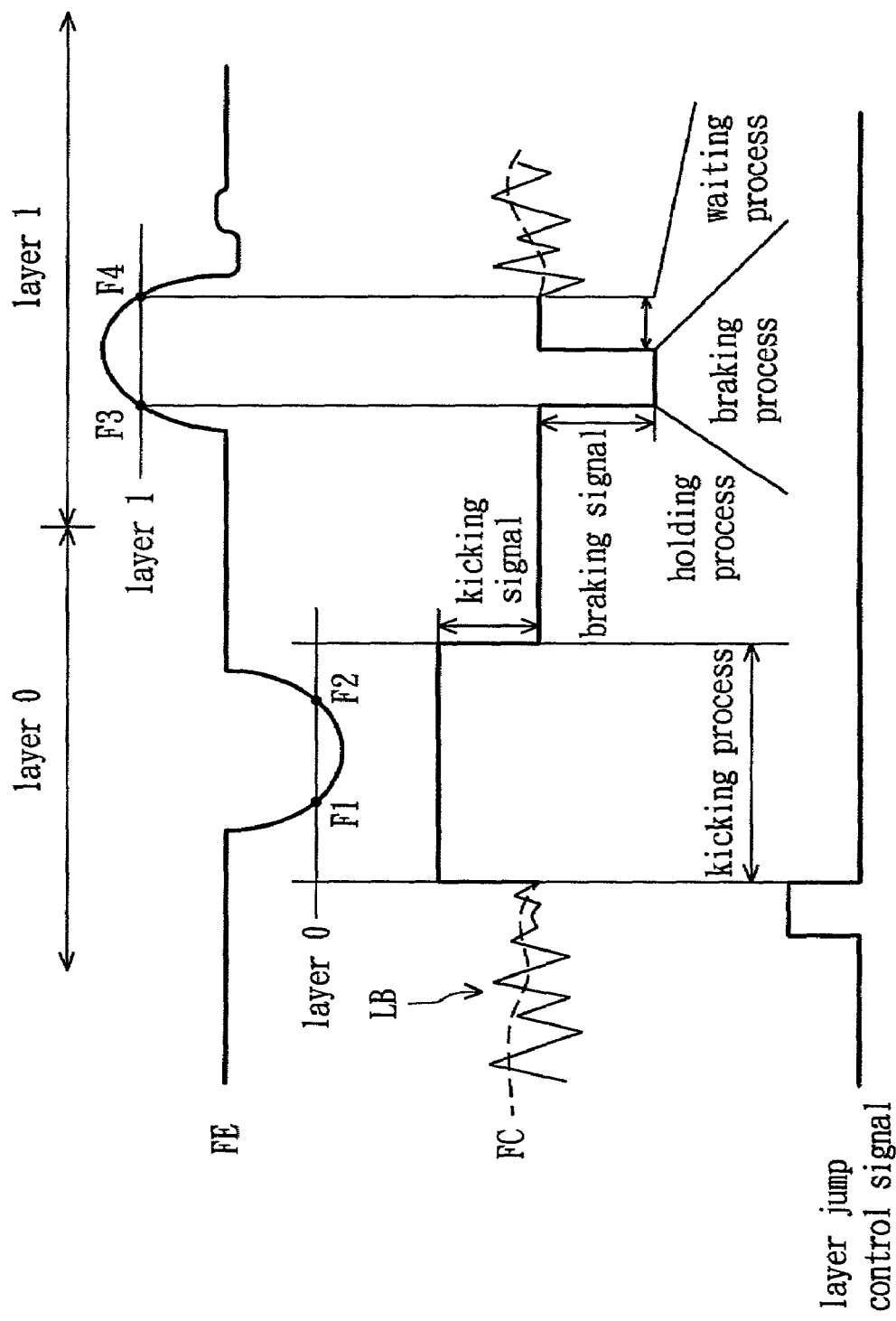
FIG. 3 is a schematic view showing the focusing error signal FE and the focusing control signal FC in the layer jump process.

As shown in FIG. 3, the pre-amp 120 sends the focusing error signal FE when the layer jump process is not performed. At this time, the switch 160 connects to the node of the controller 130, so that the focusing control signal FC produced by the controller 130 controls the driving device 150 to send the driving force that maintains the lens 115 in the initial layer; that is, the laser spot is maintained in the initial layer, such as layer 0 in FIG. 3. It should be noted that the focusing control signal FC changes due to the layer distance variation or the disk wobbling of the DVD disk, so that the layer distance balancing signal LB produced by the low pass filter 140 keeps changing.

Figure 4:
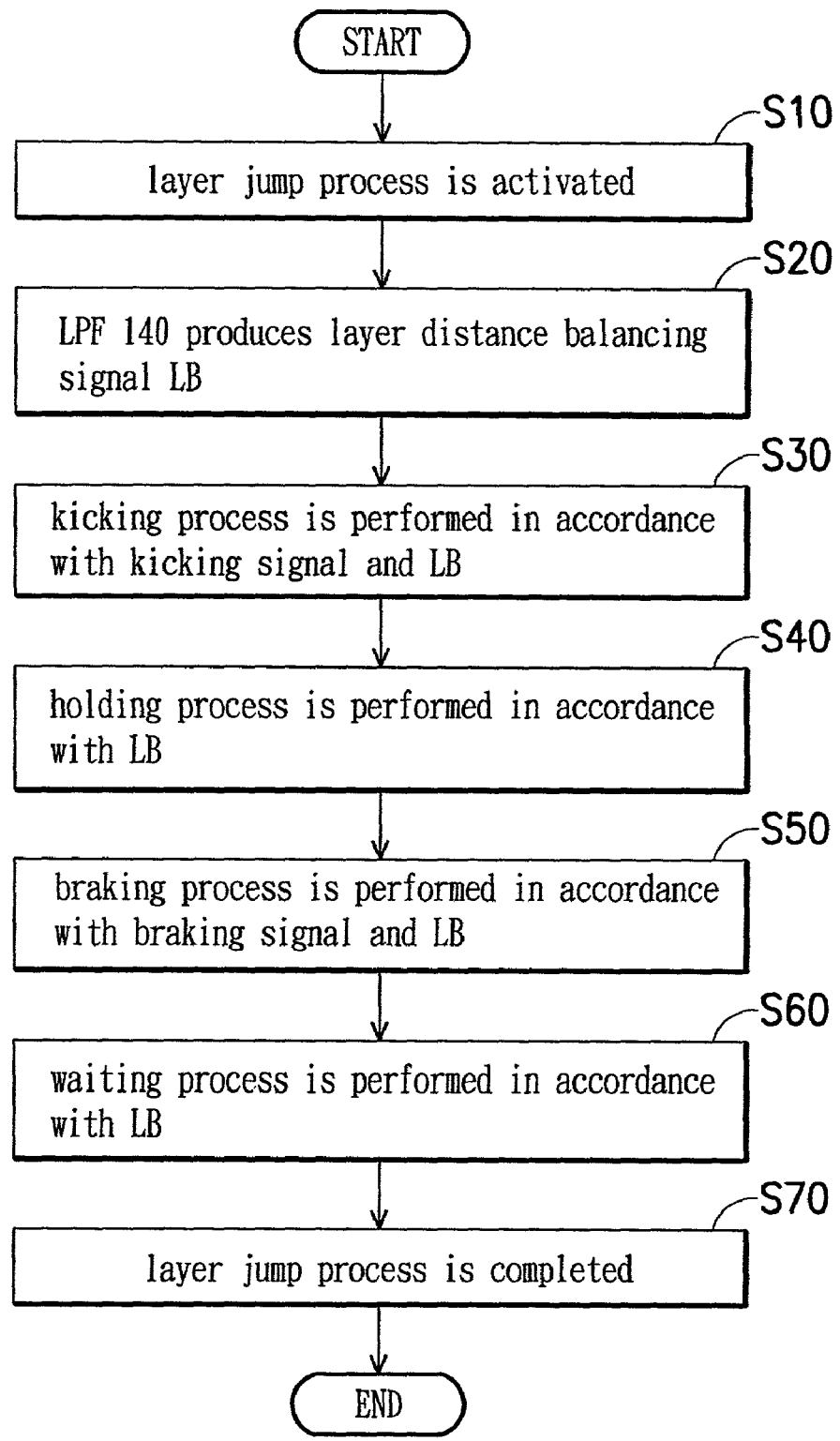
FIG. 4 is a flow chart showing the layer jump process performed in the optical drive of the present invention.

Referring to FIG. 4, if a pulse of layer jump control signal is applied to the switch 160, the layer jump process is activated (step S10). At this time, the switch 160 connects to the node of low pass filter 140 as exactly shown in FIG. 3, and the low pass filter 140 produces the layer distance balancing signal LB (step S20) and fixes the value of the layer distance balancing signal LB. Then, the layer distance balancing signal LB is sent in coordination with the kicking signal to the driving device 150 to perform the kicking process (step S30) as shown in FIG. 3. The checking points F1 and F2 of the focusing error signal FE determine if the laser spot moves away from the initial layer in the kicking process.

When the kicking process is completed, that is, the laser spot moves away from the initial layer, the kicking signal is eliminated so that only the layer distance balancing signal LB is sent to the driving device 150 for determination of the driving force, thus performing the holding process (step S40). In the holding process, the lens 115 keeps moving toward the target layer; that is, the laser spot keeps moving toward the target layer, such as layer 1 in FIG. 3. The checking point F3 of the focusing error signal FE is used to determine if the holding process should be completed.

Then, as shown in FIG. 3, the focusing error signal FE reaches the checking point F3, which means that the lens 115 is moving closely enough to the linear control area of layer 1. At this time, the braking signal is applied together with the layer distance balancing signal LB to be sent to the driving device 150 for performing the braking process (step S50) for a certain time.

However, the braking process does not guarantee the lens 150 to be placed in the linear control area of layer 1. In order to ensure the layer jump process to be performed successfully, the waiting process is applied (step S60) in correspondence to the layer distance balancing signal LB. A checking point F4 is used to determine if the waiting process should be completed.

When the waiting process is completed, the switch 160 reconnects to the node of the controller 130 for sending the focusing control signal FC to the driving device 150, and the layer jump process is completed (step S70). At this time, the low pass filter 140 repeatedly produces the layer distance balancing signal LB.

The above-mentioned control of the layer jump process is described in an embodiment in which the lens 150 moves from layer 0 to layer 1. However, the method is applicable in the layer jump process from layer 1 to layer 0.

While the present invention has been described with reference to the preferred embodiments thereof, it is to be understood that the invention is not limited to the described embodiments or constructions. On the contrary, the invention is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A layer jump control apparatus for controlling a layer jump process of an optical drive, wherein the layer jump process comprises a kicking process, a holding process, a braking process and a waiting process, the layer jump control apparatus comprising:
   a pick up head having a lens and a voice coil motor, wherein the pick up head drives the voice coil motor in accordance with a driving force to vertically move the lens;
   a preamplifier for producing a focusing error signal;
   a controller for receiving the focusing error signal and producing a focusing control signal;
   a low pass filter for receiving the focusing control signal and producing a layer distance balancing signal; and
   a driving device for outputting the driving force;
   wherein:
   the driving device receives the focusing control signal to determine the driving force when the optical drive does not perform the layer jump process;
   the driving device receives a kicking signal and the layer distance balancing signal to determine the driving force when the optical drive performs the kicking process;
   the driving device receives a braking signal and the layer distance balancing signal to determine the driving force when the optical drive performs the braking process;
   the driving device receives the layer distance balancing signal to determine the driving force when the optical drive performs the holding process and the waiting process;
   the braking process is initiated when the focusing error signal reaches a first checking point, and is performed for a certain time; and
   the waiting process is performed after the braking process, and is completed when the focusing error signal reaches a second checking point.

2. The layer jump control apparatus according to claim 1, wherein the optical drive is a DVD drive.

3. The layer jump control apparatus according to claim 1, wherein the controller is an equalizer.

4. The layer jump control apparatus according to claim 1, wherein the layer distance balancing signal is a direct current voltage level of the focusing control signal.

5. An optical drive for performing a layer jump process, wherein the layer jump process comprises a kicking process, a holding process, a braking process and a waiting process, the optical drive comprising:
   a pick up head having a lens and a voice coil motor, wherein the pick up head drives the voice coil motor in accordance with a driving force to vertically move the lens;
   a preamplifier for producing a focusing error signal;
   a controller for receiving the focusing error signal and producing a focusing control signal;
   a low pass filter for receiving the focusing control signal and producing a layer distance balancing signal; and
   a driving device for outputting the driving force;
   wherein:
   the driving device receives the focusing control signal to determine the driving force when the optical drive does not perform the layer jump process;
   the driving device receives a kicking signal and the layer distance balancing signal to determine the driving force when the optical drive performs the kicking process;
   the driving device receives a braking signal and the layer distance balancing signal to determine the driving force when the optical drive performs the braking process;
   the driving device receives the layer distance balancing signal to determine the driving force when the optical drive performs the holding process and the waiting process;
   the braking process is initiated when the focusing error signal reaches a first checking point, and is performed for a certain time; and
   the waiting process is performed after the braking process, and is completed when the focusing error signal reaches a second checking point.

6. The optical drive according to claim 5, wherein the optical drive is a DVD drive.

7. The optical drive according to claim 5, wherein the controller is an equalizer.

8. The optical drive according to claim 5, wherein the layer distance balancing signal is a direct current voltage level of the focusing control signal.

9. A method of controlling an optical drive to perform a layer jump process, wherein the optical drive comprises a preamplifier, a controller, and a low pass filter, the method comprising the steps of:

receiving a focusing error signal produced by the preamplifier in the controller to produce a focusing control signal;

sending the focusing control signal to the low pass filter to produce a layer distance balancing signal;

performing a kicking process to determine a driving force in accordance with a kicking signal and the layer distance balancing signal;

performing a holding process to determine the driving force in accordance with the layer distance balancing signal;

performing a braking process for a certain time, to determine the driving force in accordance with a braking signal and the layer distance balancing signal, wherein the braking process is initiated when the focusing error signal reaches a first checking point; and performing a waiting process to determine the driving force in accordance with the layer distance balancing signal, after the braking process and until the focusing error signal reaches a second checking point.

10. The method according to claim 9, wherein the optical drive is a DVD drive.

11. The method according to claim 9, wherein the controller is an equalizer.

12. The method according to claim 9, wherein the layer distance balancing signal is a direct current voltage level of the focusing control signal.

13. The method according to claim 9, further comprising driving a pick up head in accordance with the driving force to vertically move a lens.

* * * * *